United States Patent

[11] 3,592,153

| [72] | Inventor | Gregory John Margereson Pudsey, England |
|---|---|---|
| [21] | Appl. No. | 807,532 |
| [22] | Filed | Mar. 17, 1969 |
| [45] | Patented | July 13, 1971 |
| [73] | Assignee | W. J. Clarkson Limited Leeds, Yorkshire, England |
| [32] | Priority | Mar. 28, 1968, Apr. 22, 1968 |
| [33] | | Great Britain |
| [31] | | 14892/68 and 18899/68 |

[54] MACHINE POSITIONING MEANS
7 Claims, 7 Drawing Figs.

| [52] | U.S. Cl. | 112/219, 74/216.5, 192/144 |
|---|---|---|
| [51] | Int. Cl. | D05b 69/22 |
| [50] | Field of Search | 112/219, 220, 221, 67, 87; 192/138, 139, 143, 144; 74/216.5, 222, 242, 242.10, 242.11, 242.1 R |

[56] References Cited
UNITED STATES PATENTS

| 1,850,708 | 3/1932 | Davis | 112/219 |
|---|---|---|---|
| 3,199,479 | 8/1965 | Boser et al. | 112/219 |
| 3,204,592 | 9/1965 | DeJong | 112/219 |
| 3,320,914 | 5/1967 | Adams | 112/219 |
| 3,352,396 | 11/1967 | Moseley | 112/219 X |
| 3,380,415 | 4/1968 | Proffit et al. | 112/219 |
| 3,439,638 | 4/1969 | Zuk | 112/219 |

Primary Examiner—H. Hampton Hunter
Attorney—Pierce, Scheffler & Parker

ABSTRACT: The invention comprises a device for automatically repositioning a machine if it comes to rest in an unwanted position, said device including a fluid power operated piston-cylinder unit adapted to give rotary motion to a machine shaft, a fluid pressure system including a control valve, a sensing unit on the shaft for controlling the valve, and means for bringing the sensing unit into operation when a braking action brings the machine to rest. The sensing unit is preferably electrical and the device is eminently applicable to sewing machines for positioning the needle.

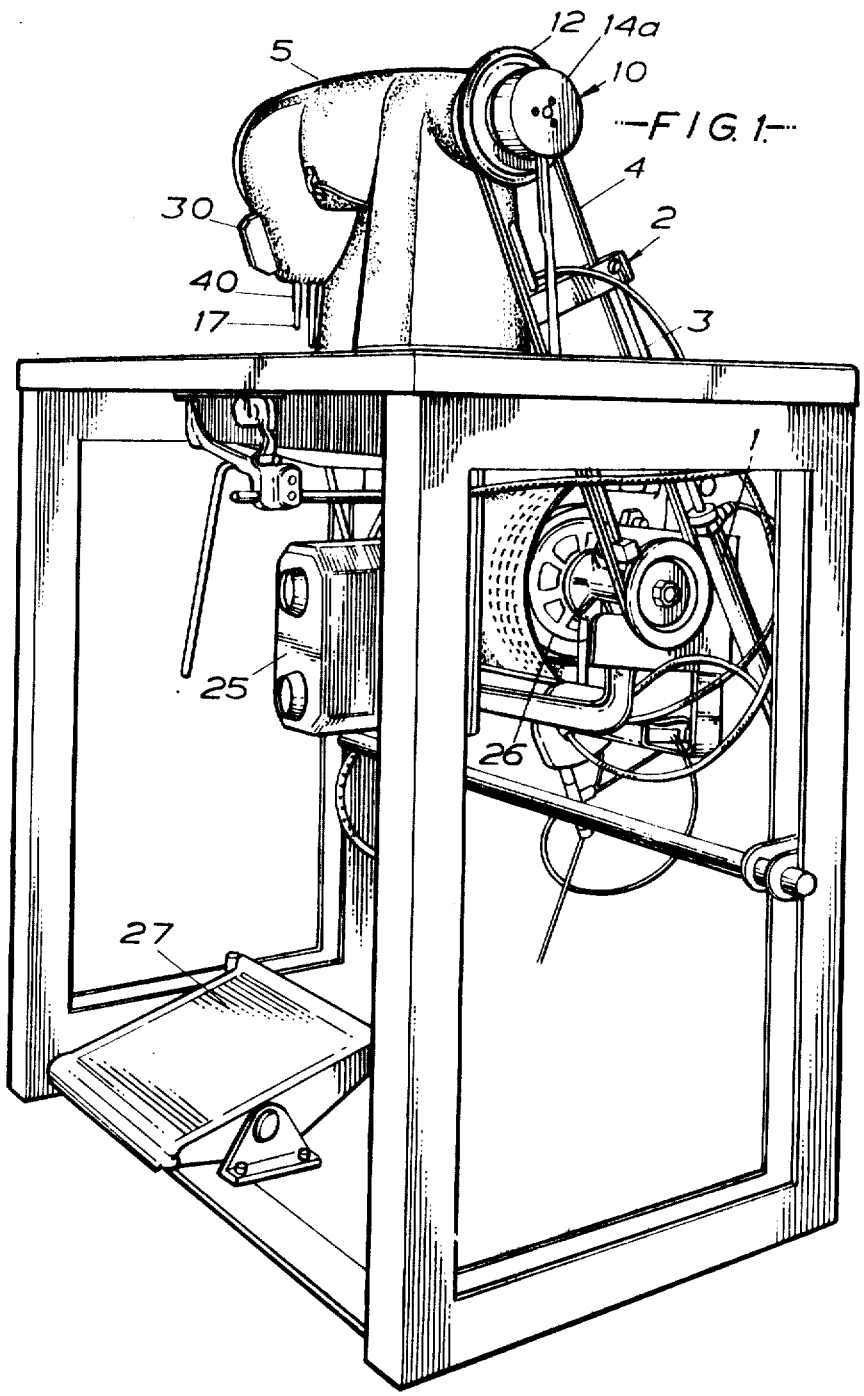

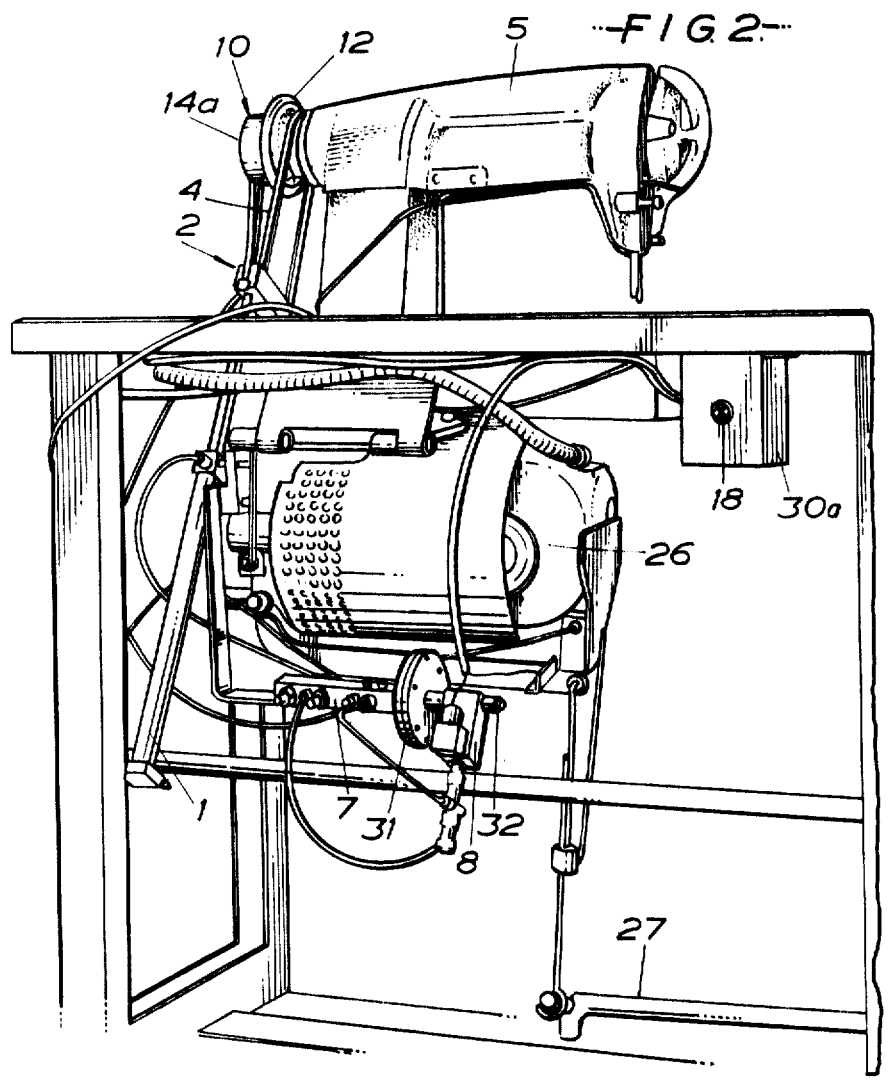

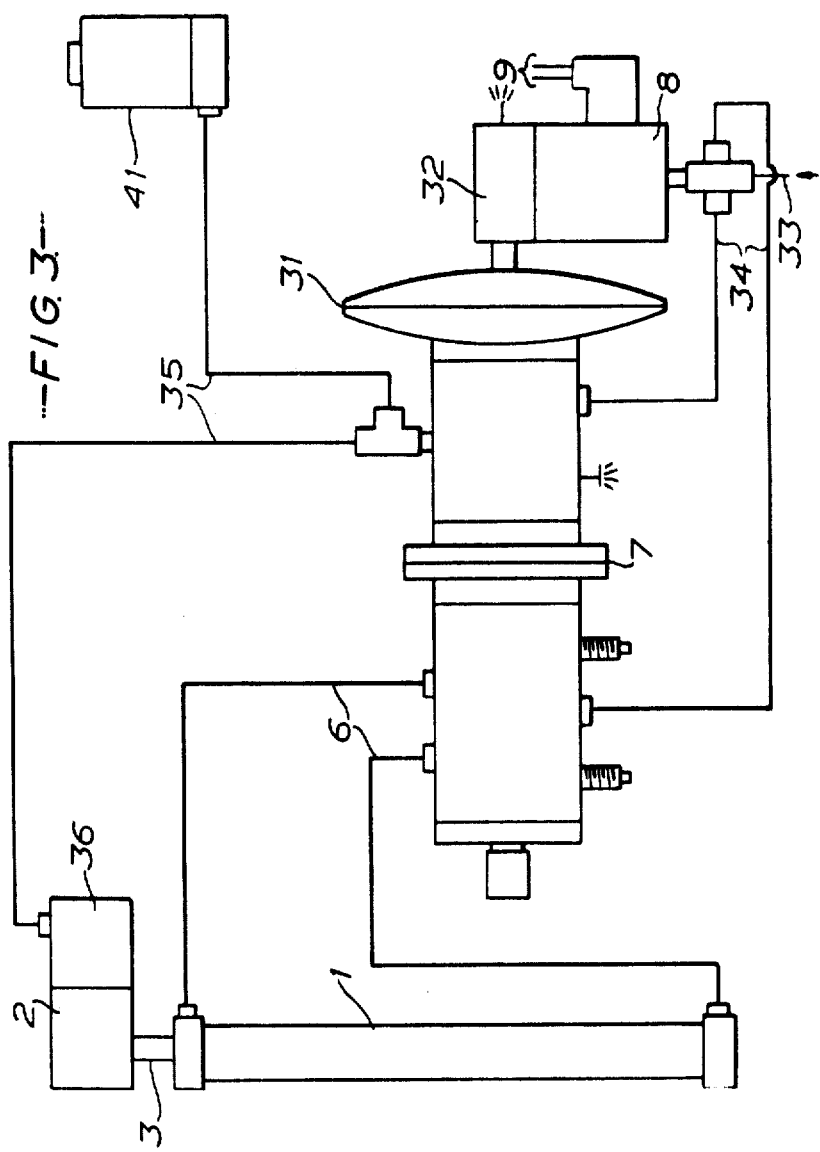

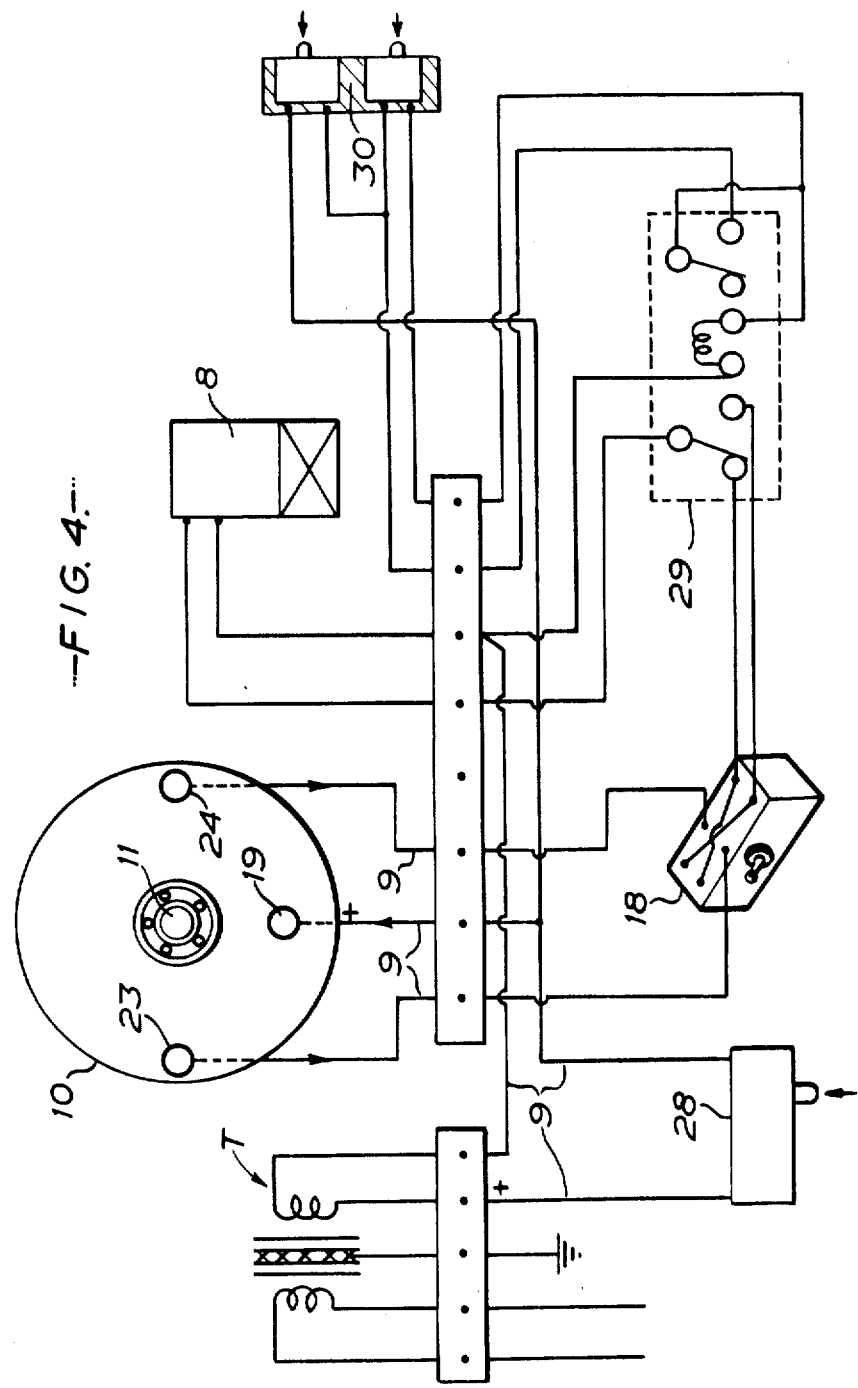

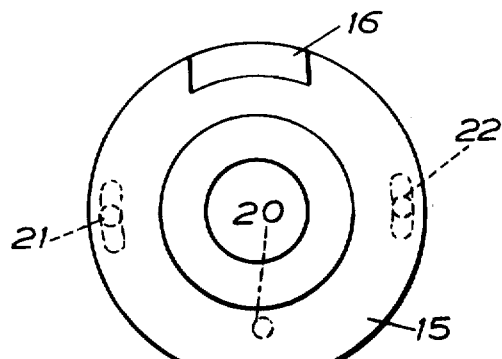
-FIG. 5.-
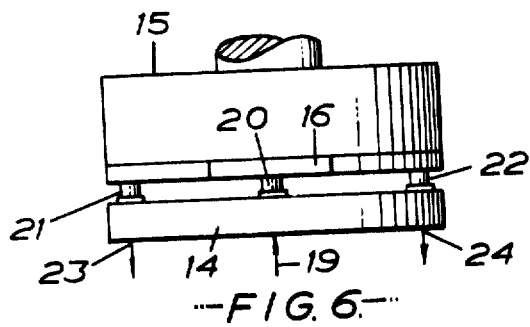
-FIG. 6.-
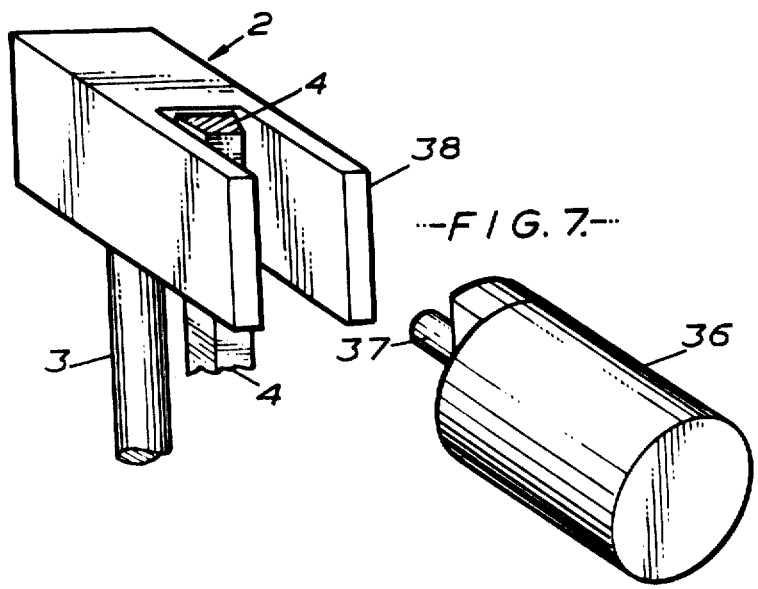
-FIG. 7.-

MACHINE POSITIONING MEANS

This invention relates to machines, particularly sewing machines of the industrial type, and to the positioning of a machine when motion ceases.

In the manufacture of garments on industrial sewing machines, vital time can be saved by the operator if she does not have to operate the hand wheel in order to locate the needle in a suitable position. For example, if a sewing machine comes to rest with the needle penetrating the garment being stitched the operator has to use the hand wheel in order to get the needle into top position before the work can be withdrawn Alternatively, when an operator wishes to make a turn during the stitching run, time can be saved if the work is pivoted on the needle, i.e. with the needle actually penetrating the material.

For the above reason needle positioners have been introduced to the garment producing industry in the last few years by which the sewing machine operator can automatically select that the needle will finish in either the up or down position. Hitherto most needle positioners have cost as much as the machine to which they are fitted.

For the above reason needle positioners have been introduced to the garment producing industry in the last few years by which the sewing machine operator can automatically select that the needle will finish in either the up or down position. Hitherto most needle positioners have cost as much as the machine to which they are fitted.

On the other hand, other types of machines, including looms, often require to be positioned for adjustment or repair work, or for some other reason.

According to this invention a machine positioning device comprises a fluid power operated piston-cylinder unit adapted to transmit rotary motion in a given direction to a machine shaft, and a sensing unit on a machine shaft adapted to operate a valve in the supply system to the piston-cylinder unit to operate said unit and thus adjust the machine shaft after normal operation of the machine has ceased.

In a sewing machine the shaft adjustment will be to position the needle.

The fluid power can be hydraulic or pneumatic supplied from a pump associated with the machine, or from a compressed air line. The sensing unit may be electrical slip ring means to electrically operate the valve.

Moreover, the aforesaid piston-cylinder unit may be furnished with belt gripping means on the end of the piston rod and comprise an auxiliary fluid operated piston-cylinder unit whose ram is adapted to trap the belt in a bifurcated member carried by the main unit piston rod. This auxiliary unit is timed to operate in conjunction with the main piston-cylinder unit so that a belt is gripped initially and then the main unit will operate to move the belt.

A second auxiliary fluid cylinder may be timed to operate in conjunction with the cylinder already mentioned for the belt clamping unit and at the same time. This cylinder will actuate the clutch brake lever which is attached to the sewing machine clutch motor.

The invention will now be more particularly described with reference to the accompanying drawings, in which:

FIG. 1 is a perspective view of an industrial sewing machine with the invention applied thereto;

FIG. 2 is another perspective view of the sewing machine and belt gripping device;

FIG. 3 is a diagrammatic layout of the pneumatic control circuit;

FIG. 4 is a diagrammatic layout of the electrical control circuit;

FIG. 5 is a face view of the control slip ring;

FIG. 6 is a diagrammatic plan view of the slip ring unit; and

FIG. 7 is a perspective exploded view of the belt gripping device.

The invention may comprise a fluid power operated piston-cylinder unit 1 furnished with gripping means 2 on the end of the piston rod 3. Such gripping is adapted to engage the driving belt 4 of a sewing machine 5 and grip it in a manner that enables the unit 1 to apply a required amount of movement to the belt in one direction. This unit is supplied with power from a valve controlled compressed air system 6 (FIG. 3) and the valve 7 is operated by a solenoid controlled valve unit 8 in a low voltage electrical circuit 9, (FIG. 4) say 24 volts from the transformer 'T'. This circuit includes a brush/slip ring unit 10 mounted on the top, needle operating, shaft 11 of the machine 5 and attached to the balance wheel 12 of the machine. The unit 10 comprises a fixed electrical master supply member 14 (furnished with a retained cover 14a) combined with a control ring 15 embodying an insulated sector 16. The latter can be set about the shaft axis to a required position to suit the rest position it is desired the needle 17 should be adjusted to and a selection switch 18 is provided to energize whichever electrical circuit 9 is required.

Low voltage current is fed to the terminal 19 and thence by brush 20 to the ring 15 from whence current is picked up by brush 21, or 22 and through connection 23 or 24 into the circuit 9 depending upon whether the switch 18 has been moved to the "needle" or "needle down" position. This circuit is energized after the main switch 25 has been operated to energize the driving motor 26, when the machine operator tilts the foot treadle 27 forwardly to close the motor clutch in the usual manner to operate the belt drive. Such treadle movement operates a microswitch 28.

The selection switch 18 could be wired directly to the solenoid valve unit 8 but is shown (FIG. 4) connected to a standard from a latch relay 29 which is connected to the unit 8 and controlled by a double overriding microswitch unit 30 of which one part is normally closed and the other part normally open. This unit is conveniently positioned on the machine head for quick operation and is used by the machine operator to give the needle an opposite stroke down or up from the selected needle rest position. The switch 18, transformer 'T' and relay 29 are all housed in the casing 30a.

The seven-way valve unit 7 is spring loaded in one direction and operated in the opposite direction by a diaphragm 31 operated by a piston-cylinder unit 32 which is controlled by the solenoid valve unit 8. The latter is normally open for air pressure from the supply source 33 to hold the valve 7 to the left (FIG. 3) and when the unit 8 is energized the air to the unit 32 is stopped and then flows through the system 34. The spring loading will have moved the valve 7 to the right so the air will flow to the unit 1 to extend its piston rod 3 and simultaneously (or fractionally ahead) air flows through system 35 to the auxiliary piston-cylinder units 36 and 41.

The belt gripping device 2 on the end of the piston rod 3 includes the auxiliary fluid operated piston-cylinder unit 36 with its ram 37 (FIG. 8) positioned on one side of the machine belt 4 to be capable of trapping the belt in the bifurcated member 38 carried by the piston rod 3 of the main unit 1. This unit 36 is mounted to slide on a guide rod 39 to prevent rotation of the device 2 about the axis of unit 1. The rod may be replaced by a channel section member which may also carry the valve unit 7.

The positioning cycle commences when the sewing machine has come to rest but the motor 26 is still running, the electrical switch 18 having previously been set to select in the electrical circuit 9 to the brush 21 or the brush 22. The operator tilts the treadle 27 forwardly to operate the motor clutch and a sewing operation is carried out. When the operator tilts the treadle back the clutch and attached belt drive is disconnected and the brake applied to stop the machine. If the needle is at rest in the selected top or bottom position the brush 21 (or 22) will be in contact with the sector 16 of the slip ring unit 10. If the brush is otherwise current will flow to the solenoid valve unit 8 because the braking pedal movement also closes the microswitch 28. Thus air flows to the units 1, 36 and 41 to ease the brake against the manual effort on the treadle and to cause the clamping ram 37, of the gripping device 2, to engage the sewing machine belt 4 and clamp it in the member 38. The unit 1 then operates the gripping device 2 thus rotating the sewing machine in the correct direction to position the needle. The electrical circuit 9 for this function is broken when the sector 16 registers with the brush 21 (or 22) in the slip ring unit 10 fitted to the shaft 11 of the sewing machine. This sector will first be set to the relative needle position desired. When the sector 16 is in contact with the brush the solenoid operated valve 8 will close allowing the return cycle on the cylinders of units 1, 36 and 41 to operate and air to be exhausted from the valve 7. The gripping device 2, due to the ram 37 being returned, will allow the piston rod 3 to return to a zero position without any further movement of the belt, so as not to disturb the selected needle position to which the machine has been adjusted.

The aforesaid form of dual slip ring unit includes a single control ring with one insulated sector. With this unit the current supply brush engages a continuous metallic annular track formed by the inner part of the ring face whilst two pickup brushes, either of which can be brought into circuit, engage an outer annular track face broken by the insulated sector. The number of brushes making contact with the outer annular track face is determined entirely by the number of positions in which it is desired to stop the machine, i.e. if only one selected position is required there will be one brush, two selected positions require two brushes, and so on.

Means are incorporated in the electrical brush block to vary the position of terminal 24 and contact 22 so that the needle "up" and "down" positions need not be exactly in 180 degrees opposition. This can be important on a sewing machine where the needle "up" position has to be combined with that position where thread tensions are at a minimum to facilitate work withdrawal, and a needle "down" position where the needle is used as a work pivot so as to allow the needle to be supported by the sides of the needle aperture in the machine throat plate.

When the fluid operated system is actuated at the end of the stitching sequence or by operation of switch 30 the brake cylinder unit 41 will automatically override most of any braking effect on the machine drive caused by foot pressure on the operating treadle, thus making sure that the movement given to the machine driving belt 4 and to the main shaft 11 from the action of piston-cylinder unit 1 is smooth and unimpeded. When the needle bar 40 has reached the selected position the brake adjusting cylinder unit 41 is exhausted together with and as well as the belt clamping cylinder 36, followed immediately by the main piston cylinder unit 1 which exhausts to a zero position. The unit is then ready for recycling either by the overriding switch unit 30 or at the end of the next stitching cycle.

Although the slip ring unit forms a simple efficient form of sensing device the latter may be of some other construction including a pneumatic unit.

The selection switch means can be placed on the work treadle of the sewing machine and selected at will by the operator's foot. Alternatively, switch means can be mounted on the underside of the work table in such a way that the operator's knee can actuate a lever into one of two positions thus giving "needle up" or "needle down", as required. A further alternative would be to put a switch means on the work table top for selection at a touch of the operator's finger.

It is essential that the stroke of the fluid operated piston-cylinder unit shall always exceed the circumference of the sewing machine belt pulley so that the positioning of the needle is always possible regardless of the stopping position of the insulated sector brush gear.

The belt gripping device may take a variety of other forms. One other convenient construction comprises a bifurcated member 38 carrying an eccentrically mounted roller between its jaws. The belt passes through the jaws in the space between the roller and the base of the jaws. The shaft mounting in the eccentric roller is fitted with a small gravity weight so that any forward motion of the rod 3 will allow the cam motion of the eccentric roller to lock the belt against the base of the bifurcated jaws of the member. A second method of activating the locking device would be to connect a lever from the eccentric roller pin to the piston rod of the aforesaid piston-cylinder unit 1 so that when the rod moves forwardly it swings the roller against the belt to trap it and continued movement moves the gripped belt.

There are other machines in productive industry which, on stopping, require to be moved to a particular position or positions so that the machine operative can inspect or otherwise rearrange the work being done. One of these that comes to mind immediately is the weaving loom. Most of these looms are fitted with automatic stop devices which bring the machine to a halt in the event of a warp end or a weft supply breaking. When this happens the operative has to repair the break in a manner that will avoid creating a fault in the pattern being woven. To do this it is necessary to turn the machine over so as to leave the warp shed in either the open or the closed position. On some looms, this can be done by turning a hand wheel. Other looms, especially where a magnetic brake is part of the electrical equipment, an inching device is incorporated to bring the warp shed to the required position. In others, the operative "slips" the clutch drive until the required position is reached.

It is considered that although the invention has been described for use on a relatively lightweight machine for positioning a needle, the basic principle of using a powered belt gripping device could be adapted or modified for heavier duties. In the case of looms, the required stopped positions would be (1) warp shed open and (2) warp shed closed. An inching device to move the machine from position (1) to position (2) and return would also be useful as in the case of sewing machines. Thus a driving belt could be gripped as aforesaid.

There may be many other belt-driven machines in industry using a reciprocating action in which it would be found useful for the reciprocating movement to be arrested in the up or the down position.

I claim:

1. A device for positioning a belt-driven shaft of a machine in a desired angular position, said machine including brake means for stopping said shaft, said device comprising a main fluid power operated piston-cylinder unit, a piston rod carrying said piston, a belt-gripping device carried by said piston rod, means for controlling said belt-gripping device to selectively grip and release said belt, a valve, a pressurized fluid system controlled by said valve for operating said unit, said control means including a sensing unit operated by rotation of said shaft, said sensing unit including means to control said valve, and control means for said sensing unit arranged to bring said sensing unit into an operative condition when said machine braking means are operated, whereby if said shaft comes to rest out of said desired angular position, said sensing unit operates said valve and causes said belt-gripping device to grip said belt and said piston-cylinder unit to operate to move said belt-gripping device along the path of said belt and thus to drive said gripped belt to move said shaft into said desired angular position.

2. A device according to claim 1, wherein said belt-gripping device comprises an auxiliary fluid operated piston-cylinder unit and a cooperative member, the piston of said unit being arranged to trap said belt against said cooperative member to grip said belt.

3. A device according to claim 1, wherein said belt-gripping device comprises a bifurcated member and an auxiliary fluid operated piston-cylinder unit, both carried by said piston rod of said main unit, said bifurcated member and auxiliary unit forming a gap therebetween for free passage of said belt, the piston of said auxiliary unit facing into said gap for the purpose of trapping said belt against said bifurcated member when said piston is extended.

4. A device according to claim 3, wherein fluid pressure to said auxiliary unit is controlled by said valve controlling said main unit.

5. A device according to claim 4, including a second auxiliary piston-cylinder unit controlled by said valve, said brake means being manually controlled, said second auxiliary unit being positioned adjacent said manually controlled brake and controlled to offset at least some of the manual effort applied to the brake when the machine is being stopped.

6. A device according to claim 5, wherein said valve is spring loaded lengthwise in one direction and fluid-pressure operated in the opposite direction, and including a solenoid controlled valve for directing fluid pressure selectively to operate said valve in said opposite direction against said spring loading, or to ports in said valve for passage to said piston-cylinder units when said spring loading has shifted said valve in said one direction.

7. A device according to claim 1, wherein said sensing unit comprises an electrical slip ring unit controlling current feed to two electrical brush contacts, each associated with a different one of two desired angular positions of said shaft, said electrical brush contacts controlling a low voltage electrical circuit including a switch responsive to operation of said machine braking means to place said circuit in operative condition, said valve control means including a solenoid, a manually operated selection switch unit for connecting a desired one of said brush contacts into said circuit, a latch relay, and a manually operated overriding switch unit connected to operate said latch relay to connect the other of said brush contacts into said circuit for causing a further rotary motion of said machine shaft.